Patented Nov. 17, 1942

2,302,643

UNITED STATES PATENT OFFICE 2,302,643

METHOD AND COMPOSITION FOR TREATING METALS

John S. Thompson, Detroit, Mich., assignor to Parker Rust Proof Company, Detroit, Mich.

No Drawing. Application May 26, 1941,
Serial No. 395,206

19 Claims. (Cl. 148—6)

This invention relates to the field of chemically treating metal surfaces so as to increase their corrosion resistance and their paint holding qualities. This application is a continuation in part of application Serial No. 97,298, filed August 21, 1936. More particularly, this application relates to the coating of a metal surface of iron or zinc with an acidulated aqueous solution containing the sulfite ion and preferably containing a soluble compound of a metal below magnesium in the electromotive series. The acidulation of the solution may be secured by sulfurous acid or by other inorganic acids such as phosphoric acid, sulfuric acid, and hydrochloric acid.

The coating produced in accordance with this invention is predominately oxide and sulfide. Where a soluble compound of another metal is employed in the solution there will ordinarily be compounds of this metal also in the coating, predominately as oxide or sulfide. These coatings are thin, continuous, and adherent, and increase the resistance to corrosion and also form a good bond for a siccative coat such as paints, lacquers and enamels.

When phosphoric acid is employed to acidulate the solution there is generally a small amount of phosphate in the resulting coating, especially if there is any considerable amount of phosphates in the solution. The amount of the phosphate in the coating varies greatly with the concentration of the phosphoric acid in the solution and with the temperature at which the coating action is produced. For example, it has been found that a solution containing only 5 cc. of 75% phosphoric acid per gallon of solution has resulted, under the same conditions otherwise, in a coating containing approximately three times the amount of phosphate that was produced in a solution containing 8 cc. of 75% phosphoric acid to a gallon. As the amount of phosphoric acid in the solution is increased, the amount of phosphate in the coating is decreased.

Also the amount of phosphate in the coating is greatly increased by increased temperature. For example, it has been found that with from 18 cc. to 30 cc. of 75% phosphoric acid in a gallon of solution there is of the order of ten times as much phosphate in the coating produced at 160° F. as there is in the coating produced by the same solution at 100° F. It will be readily seen from the above that, by controlling the amount of phosphoric acid in the solution and the temperature at which it is used, the amount of phosphate in the resultant coating can be readily reduced to a minor part of the coating. In this way, phosphoric acid may be employed to acidulate the solution while still producing a coating which is essentially oxide and sulfide.

As indicated above, the presence in the solution of a soluble compound of a metal below magnesium in the electromotive series accelerates the coating action and usually results in a somewhat firmer coating which comprises compounds of the metal from the solution. It will be obvious that metals and compounds thereof must be chosen which are soluble in the particular solution being used to an extent sufficient to produce some effect upon the coating action, but it requires only a small amount of such metal compound to produce a pronounced effect, especially where the metal in the solution is materially below the metal being coated in the electromotive series.

While in coating solutions in accordance with this invention successful use has been made of compounds of copper, silver, manganese, tungsten, mercury, zinc, cadmium, cobalt, nickel, lead, bismuth, trivalent chromium, aluminum, antimony, molybdenum, and arsenic, in coating iron it is generally preferred to use compounds of zinc, cadmium, manganese, cobalt, nickel, copper and trivalent chromium. Of course, a certain amount of compounds of iron is obtained from the work in a solution employed to coat iron, whether they are introduced intentionally or not, and it has been found that, in coating zinc, compounds of iron constitute very satisfactory accelerators of the coating action. The following specific examples may be given of solutions which have been employed successfully:

Example #1

When 10 cc. of 75% ortho-phosphoric acid and 3 grams of sodium sulfite are added to 1000 cc. of water, a coating is formed on iron and steel when the surface of the iron or steel is treated with the solution at 100° F. This coating action may be accelerated by the employment in the solution of a small amount of soluble compounds of various metals. For example, 0.6 gram of chromic sulfate or other chromic salts have an accelerating effect. 4½ grams of zinc dihydrogen phosphate also accelerates the coating action while increasing noticeably the amount of phosphate in the coating. Other zinc compounds may be employed which will result in zinc in the coating, largely as sulfide. As little as 0.2 gram of molybdenum oxide or 0.1 gram of basic lead carbonate or 0.4 gram of sodium arsenate have a noticeable effect upon the coating action.

It will be noted that the amounts of the compounds of metals in the solution vary considerably with their position in the electromotive series above or below the metal being coated. In general, the compounds of metals above the metal being treated in the electromotive series can be used in relatively large amounts, but relatively small amounts are preferable where there is used a compound of a metal much below the metal being coated in the electromotive series. Metals low in the electromotive list may be deposited at least in part in the metallic form.

Example #2

A solution composed of one gallon of water, 20 cc. of 95% sulfuric acid and 10 grams of sodium sulfite produces an oxide and sulfide coating on iron or steel in one minute when applied to the metal surface by means of a mechanical spraying machine at 100° F. A heavier or firmer coating is produced in the same time when there is added to the solution a soluble compound of a metal such as described in connection with Example #1.

It will be understood that other compounds of metals may be employed in accordance with the principles stated above and that combinations of different compounds may be employed if desired. Also hydrochloric acid may be employed in place of phosphoric or sulfuric, or combinations of acids may be employed.

The solutions in accordance with this invention may be applied to the metal surfaces in any suitable manner. The metal article may be immersed in the solution or the solution may be sprayed onto the surface in a thin film by means of a compressed air spray gun, with or without inert material to hold the solution in place on the surface until reaction is complete. The solution may be poured over the surface, or applied in any other way so that proper contact will be maintained between the solution or a film thereof and the surface of the metal until the desired reaction has taken place.

The sulfite is partially reduced during the reaction, and when exposed to the air, as by spraying, there is some regeneration of the sulfite by the oxidizing action of the air.

The processing time depends largely upon the temperature employed. Where a temperature of 100° F. is employed a satisfactory paint holding coating may be produced by solutions of the character indicated in the examples in from 30 seconds to 2 minutes. Higher temperatures may be employed, but they increase the loss of sulfite from the solution. It is preferable therefore to employ as low temperatures as are consistent with the production of the desired coating within a commercially acceptable short time.

Added corrosion resistance and better paint holding qualities are obtained where the coating formed as described above is treated with a solution of chromic acid. A solution containing 2 grams of $CrO_3$ per gallon of water has been used with good results. When $CrO_3$ is dissolved in ordinary tap water, it reacts with the calcium present to form some calcium dichromate. Also, the solution dissolves some of the coating, and forms dichromate in the solution. The stronger this solution in chromic acid, the more rapid its action on the coating. The dichromates in the solution do no harm, and when a film of the solution is dried on the work, any dichromate in the solution adds to the chromium in the final coat; but it has been found desirable to retain at least some free chromic acid in the solution. In the appended claims, where a dilute solution of chromic acid is specified, it is not intended to exclude the presence of dichromates, but it is intended to require the presence of free chromic acid.

After the treatment by the dilute chromic acid solution it is preferable to dry the retained film of solution on the coating, and it is preferable to do the drying at an elevated temperature. During the reaction of the chromic acid solution with the coating there is a reduction of some of the hexavalent chromium to the trivalent form, so that the final coating as a result of this treatment contains both trivalent and hexavalent chromium. However, quite satisfactory results may be obtained even where the treatment, including the baking, is carried out so that there is very little hexavalent chromium in the final coating, most if not all of it being reduced to the trivalent form. The quality of the coating seems to be materially improved by the trivalent chromium reduced in situ, and for some purposes the presence of some unreduced hexavalent chromium in the final coat is advantageous.

When a soluble zinc compound is present in the coating solution used for coating iron, the coating obtained on the metallic surface will contain chemically combined zinc, chemically combined iron, oxide and sulfide. Usually the iron is mostly in the form of iron oxide and the zinc is mostly in the form of zinc sulfide, but the proportions of the ingredients of the coating will vary in accordance with the temperatures employed, the acidity of the solution, the amount of zinc in the solution, etc. Where there is a relatively small amount of zinc, it may substantially all be sulfide, and there may be also an appreciable amount of iron sulfide along with the iron oxide. Where the treatment is such that a relatively large amount of zinc is present in the coating, the iron may be substantially all in the form of oxide and there may be an appreciable amount of zinc oxide along with the zinc sulfide. Where other metals are used such as copper, manganese, cobalt, nickel, or cadmium, for example, the coatings will contain such metals, usually in the form of sulfides and/or oxides.

It will be seen therefore that, while the coating may contain minor amounts of phosphate, and an appreciable amount of trivalent and/or hexavalent chromium as a result of the final treatment with chromic acid, the coating first produced by this invention is essentially oxide and sulfide of the metal being treated and of other metal from the solution, where such other metal is employed for accelerating and hardening purposes. While the coating will contain both oxides and sulfides and these compounds will comprise both the metal being treated and other metal from the solution where such is employed, the two or more metals will seldom be equally divided between the oxides and sulfides. As indicated in connection with iron and zinc, one of the metals may be substantially all in the form of an oxide or substantially all in the form of a sulfide, so that in the appended claims where the expression "oxides and sulfides of the metal being coated and of another metal" or equivalent language is employed, it is intended to cover the presence of both oxide and sulfide and of the two or more metals in the form of oxide or sulfide, but not necessarily each metal in both forms.

I claim:

1. An article of metal of the class of iron and zinc having formed thereon a thin continuous adherent protective and bonding coating comprising essentially oxides and sulfides of the said metal and of another metal below magnesium in the electromotive series.

2. An article of metal of the class of iron and zinc having formed thereon a thin continuous adherent protective and bonding coating comprising essentially oxides and sulfides of said metal, said coating also containing $PO_4$ and trivalent chromium reduced in situ.

3. An article of metal of the class of iron and zinc having formed thereon a thin continuous adherent protective and bonding coating comprising essentially oxides and sulfides of the said metal and of another metal below magnesium in the electromotive series, said coating also containing hexavalent chromium.

4. An article of metal of the class of iron and zinc having formed thereon a thin continuous adherent protective and bonding coating comprising essentially oxides and sulfides of the said metal and of another metal below magnesium in the electromotive series, said coating also containing trivalent chromium reduced in situ.

5. An article of metal of the class of iron and zinc having formed thereon a thin continuous adherent protective and bonding coating comprising essentially oxides and sulfides of the said metal and of another metal below magnesium in the electromotive series, said coating also containing the $PO_4$ radical.

6. An article of metal of the class of iron and zinc having formed thereon a thin continuous adherent protective and bonding coating comprising essentially oxides and sulfides of the said metal and of another metal below magnesium in the electromotive series, said coating also containing the $PO_4$ radical and hexavalent chromium.

7. An article of metal of the class of iron and zinc having formed thereon a thin continuous adherent protective and bonding coating comprising essentially oxides and sulfides of the said metal and a minor amount of trivalent chromium reduced in situ and said bonding coat being covered with a siccative coat.

8. A method which comprises obtaining a corrosion resistant coating on a surface composed principally of one of the group consisting of iron and zinc by subjecting said surface to the action of an acidulated solution containing sufficient sulfite to give sulfide in the coating and thereafter treating the coated surface with a dilute solution of chromic acid.

9. A method which comprises obtaining a corrosion resistant coating on a surface composed principally of one of the group consisting of iron and zinc by subjecting such surface to the action of a solution containing sulfuric acid and a sulfite and thereafter treating said coated surface with a dilute solution of chromic acid.

10. A method which comprises obtaining a corrosion resistant coating on a surface composed principally of one of the group consisting of iron and zinc by subjecting such surface to the action of a solution containing phosphoric acid and a sulfite and thereafter treating said coated surface with a dilute solution of chromic acid.

11. A method which comprises obtaining a corrosion resistant coating on a surface composed principally of one of the group consisting of iron and zinc by subjecting such surface to the action of a solution containing hydrochloric acid and a sulfite and thereafter treating said coated surface with a dilute solution of chromic acid.

12. A method which comprises obtaining a corrosion resistant coating on a surface composed principally of one of the group consisting of iron and zinc by subjecting such surface to the action of an acidulated solution containing sufficient sulfite to give sulfide in the coating and a metal below magnesium in the electromotive series and thereafter treating said coated surface with a dilute solution of chromic acid.

13. A method which comprises obtaining a corrosion resistant coating on a surface composed principally of one of the group consisting of iron and zinc by subjecting such surface to the action of a solution containing sulfuric acid, a sulfite and a metal below magnesium in the electromotive series and thereafter treating said coated surface with a solution of chromic acid.

14. A method which comprises obtaining a corrosion resistant coating on a surface composed principally of one of the group consisting of iron and zinc by subjecting such surface to the action of a solution containing sulfuric acid, a sulfite and zinc and thereafter treating said coated surface with a dilute solution of chromic acid.

15. A method which comprises obtaining a corrosion resistant coating on a surface composed principally of one of the group consisting of iron and zinc by subjecting such surface to the action of an acidulated solution containing a sulfite and a soluble compound of trivalent chromium and thereafter treating the coated surface with a dilute solution of chromic acid.

16. A method which comprises obtaining a corrosion resistant coating on a surface composed principally of one of the group consisting of iron and zinc by subjecting such surface to the action of an acidulated solution containing a sulfite and a soluble compound of copper and thereafter treating the coated surface with a dilute solution of chromic acid.

17. A method which comprises obtaining a corrosion resistant coating on a surface composed principally of one of the group consisting of iron and zinc by spraying upon such surface an acidulated solution containing sufficient sulfite to give sulfide in the coating and respraying the solution and thereby exposing the solution to contact with the air for the oxidizing effect of the air in regenerating compounds formed by the reduction of sulfite.

18. The process of treating ferrous metal and zinc surfaces for the production of protective and of bonding coats consisting principally of metallic oxides and sulfides thereon which comprises subjecting the metal surface to the action of a solution containing the constituents of a bisulfite of a metal below magnesium in the electromotive series as the principal active ingredients to form the said coat and thereby reducing the tetravalent sulfur of the bisulfite to a form having a lower valence, regenerating the coating properties of the solution by oxidizing reduced sulfur back to the tetravalent form and subjecting further metal surfaces to the action of the regenerated solution to form oxide-sulfide coatings thereon.

19. The process of treating ferrous metal and zinc surfaces for the production of protective and bonding coats consisting principally of metallic oxides and sulfides thereon which comprises subjecting the metal surface to the action of a solution containing the constituents of a bisulfite of a metal below magnesium in the electromotive series as the principal active ingredients to form the said coat and thereby reducing the tetravalent sulfur of the bisulfite to a form having a lower valence, regenerating the coating properties of the solution by oxidizing the reduced sulfur back to the tetravalent form and subjecting further metal surfaces to the action of the regenerated solution to form oxide-sulfide coatings thereon and treating the coated surface with a dilute solution of chromic acid.

JOHN S. THOMPSON.